United States Patent

Multala

Patent Number: 5,630,378
Date of Patent: May 20, 1997

[54] SCRATCHING POST FOR PETS

[76] Inventor: Pentti V. Multala, 49 Amsden Dr., Rochester, N.Y. 14623

[21] Appl. No.: 556,486

[22] Filed: Nov. 13, 1995

[51] Int. Cl.$^6$ .................................................. A01K 13/00
[52] U.S. Cl. .................................................. 119/621
[58] Field of Search .................................. 119/621, 622, 119/652, 656, 706

[56] References Cited

U.S. PATENT DOCUMENTS

| | | | |
|---|---|---|---|
| D. 255,610 | 6/1980 | Clark-Fodor | 119/706 X |
| 2,894,487 | 7/1959 | Goldson | 119/706 X |
| 2,997,019 | 8/1961 | Bryson | 119/706 |
| 5,540,186 | 7/1996 | Udelle | 119/706 X |

*Primary Examiner*—Thomas Price
*Attorney, Agent, or Firm*—Robert J. Bird

[57] ABSTRACT

A pet scratching post includes a base, an upstanding rod, and an upstanding removable brush with a hub and radial bristles mounted on the rod. The hub has a stepped cylindrical configuration with an axial bore in the larger lower section for placement of the hub on the rod. The brush is bell shaped, with a generally toroidal lower section and a hemispherical top. The base is a large enough platform that a pet in contact with the brush also stands upon the base, keeping the post upright.

3 Claims, 2 Drawing Sheets

SCRATCHING POST FOR PETS

BACKGROUND AND INFORMATION DISCLOSURE

This invention is a scratching post or grooming post for cats and dogs to rub themselves against for brushing or scratching.

Cats keep themselves groomed by using their tongues, forelegs, rear legs, paws, and claws. They also rub against furniture or anything with an edge or corner to provide scratching action.

What is now generally known as a "scratching post" is a structure with a covering of carpet or the like on which cats sharpen their claws and exercise the tendons in their forelegs. The cat scratches the post.

SUMMARY OF THE INVENTION

A pet scratching post according to this invention includes a base and an upstanding removable brush with a hub and radial bristles. The brush is bell shaped, with a generally toroidal lower section and a hemispherical top. The base is a large enough platform that a pet in contact with the brush also stands upon the base, keeping the post upright.

DRAWING

DESCRIPTION OF PREFERRED EMBODIMENT

Figure 1:
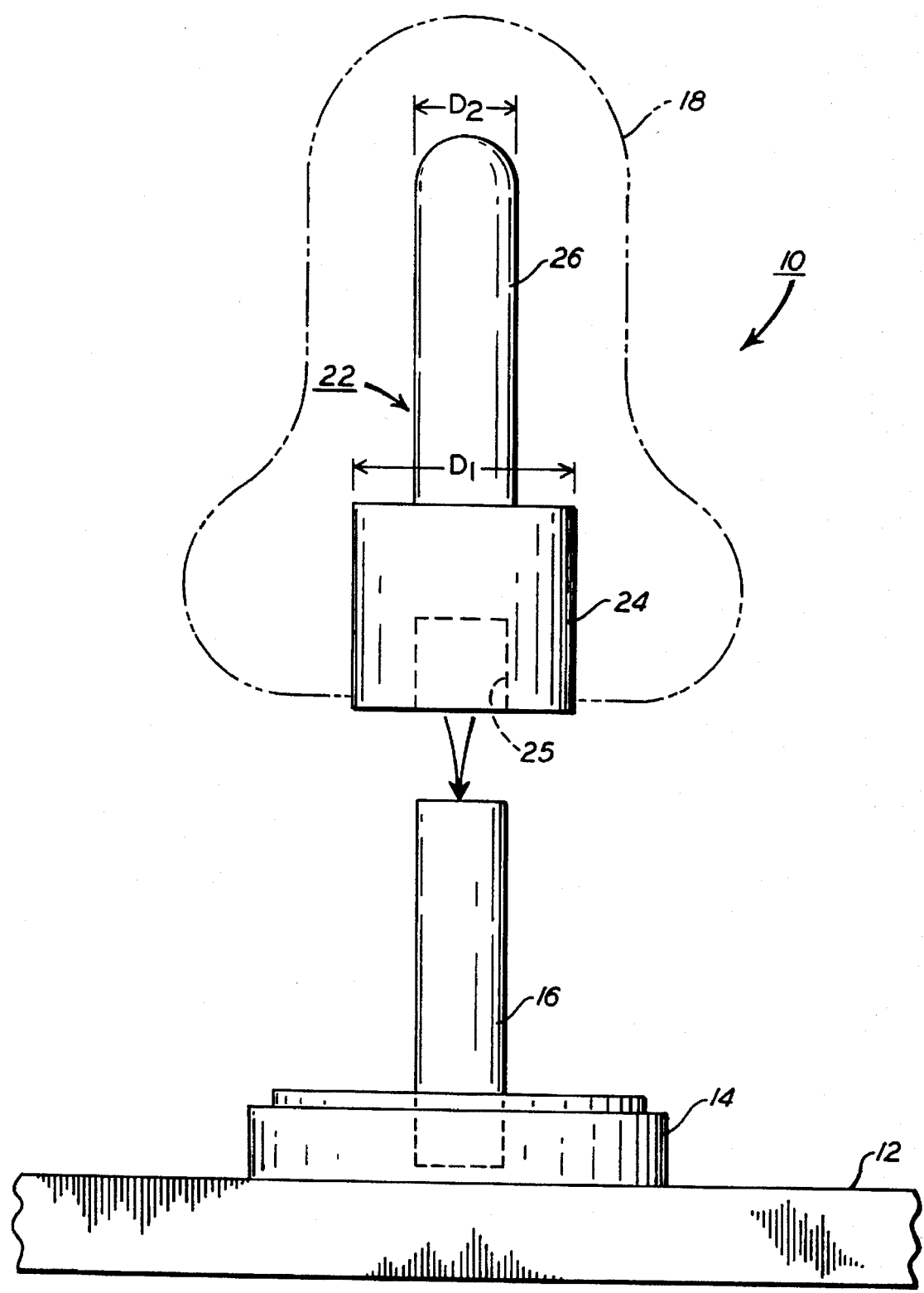
FIG. 1 is an exploded elevation view of my scratching post, with brush bristles represented in outline.
Figure 2:
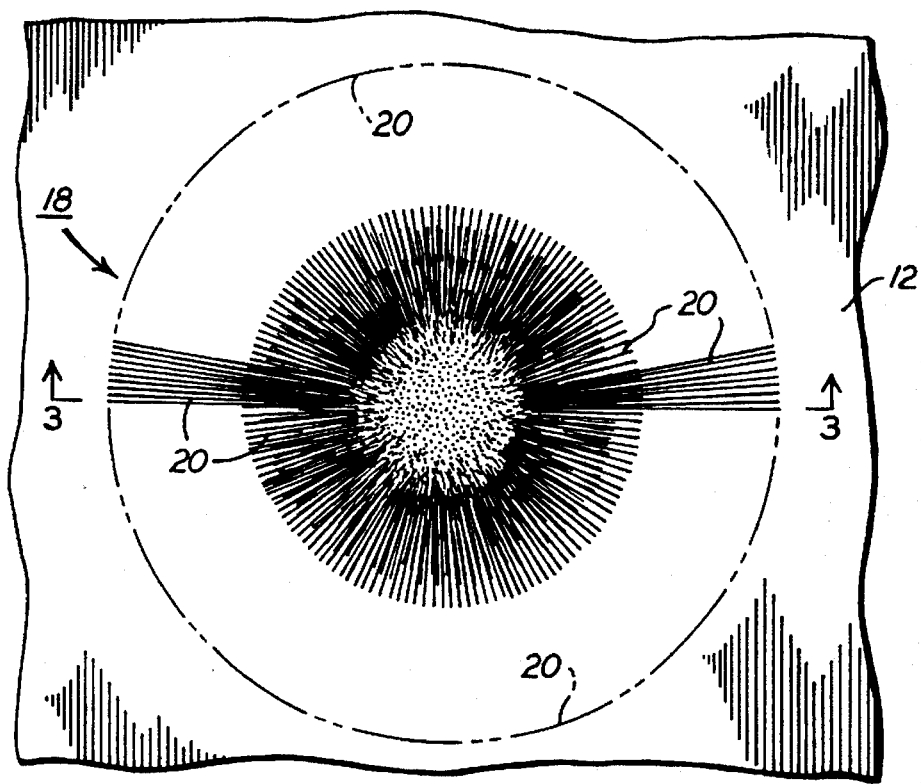
FIG. 2 is a top view of the scratching post of FIG. 1.

FIG. 1 shows a scratching post 10 including a square flat base 12, a pedestal 14, an upstanding rod 16 fixed to the base 12 or pedestal 14, and a brush 18 mounted on the rod 16. The brush 18 includes bristles 20 (FIGS. 2, 3) extending radially from a hub 22. The brush is preferably bell-shaped. The hub 22 is a stepped cylinder with a lower section 24 of outside diameter D1, and an upper section 26 of smaller outside diameter D2. The lower section 24 of the hub includes an axial bore 25 by which the hub 22 is removably mounted on the rod 16.

Figure 3:
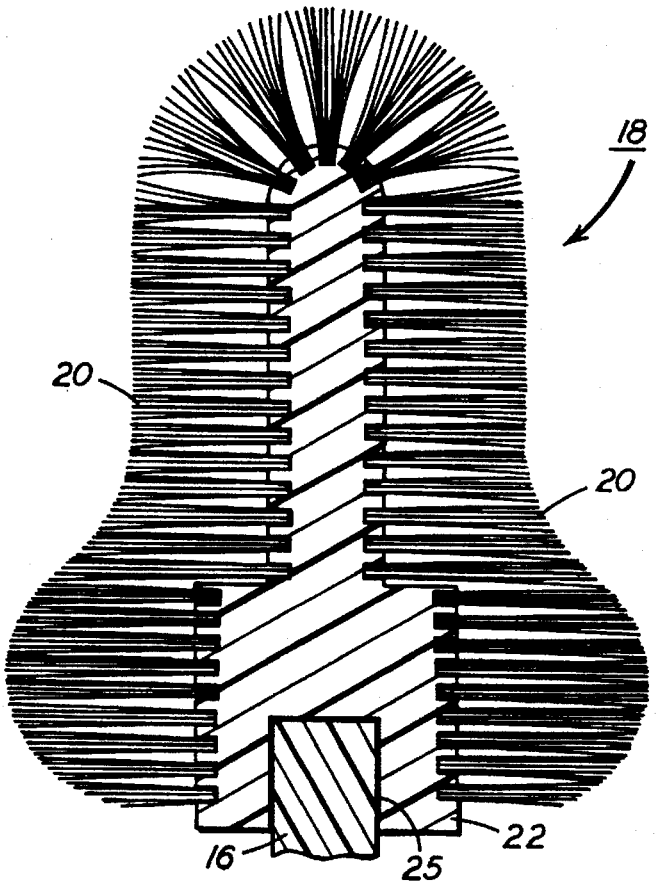
FIG. 3 is a sectional elevation view of the brush on the plane 3—3 of FIG. 2.

FIG. 3 shows the brush 18 in section, with its bristles 20 embedded in the hub 22. The brush is preferably bell shaped, with a generally toroidal lower section, a cylindrical upper section, and a hemispherical top. The brush 18 thus has many contours.

The base 12, pedestal 14, and rod 16 are preferably of wood for weight, durability, strength and aesthetics. The brush hub is preferably of a plastic material. The bristles 20 are preferably of the stiffness of a firm toothbrush.

The brush 18 and hub 22 are removable, as indicated by the arrow in FIG. 1, to permit the use of a variety of brushes sizes with the same base, and to facilitate washing of the brush.

The base 12 is large enough in area that a cat rubbing against the brush will also be standing or lying on the base, helping to keep it flat on the floor and keeping the post upright. In other words, the size of the base and the weight of the animal together give stability to the structure.

The foregoing description of a preferred embodiment of this invention, including any dimensions, angles, or proportions, is intended as illustrative. The concept and scope of the invention are limited only by the following claims and equivalents thereof.

What is claimed is:

1. A pet scratching post, including a base and an upstanding brush removably mounted thereon;

said brush including a hub and bristles extending radially from said hub;

said brush having a bell shaded configuration with a generally toroidal lower section and a hemispherical top;

said base having an area such that a pet in contact with said brush also weighs upon said base to keep said post upright.

2. A pet scratching post, including a base with an upstanding rod mounted thereon, and a brush removably mounted on the top of said rod;

said brush including a central hub and bristles extending radially from said hub;

said hub having a stepped cylindrical configuration, including a lower section of diameter D1 and an upper section of diameter D2, where D1>D2;

said hub including an axial bore to receive said rod;

said brush being bell shaped with a generally toroidal lower section, a cylindrical upper section, and a hemispherical top;

said base having an area such that a pet in contact with said brush also weighs upon said base to keep said post upright.

3. A pet scratching post, including:

a base with an upstanding rod mounted thereon;

a brush including a central hub and bristles extending from said hub;

said hub having a stepped cylindrical configuration, including a lower section of diameter D1 and an upper section of diameter D2, where D1>D2;

said hub adapted for removable placement upon said rod;

said brush being bell shaped with a generally toroidal lower section, a cylindrical upper section, and a hemispherical top;

said base having an area such that a pet in contact with said brush also weighs upon said base to keep said post upright.

* * * * *